(12) United States Patent
Chilamakuri et al.

(10) Patent No.: US 11,270,483 B1
(45) Date of Patent: Mar. 8, 2022

(54) UNIFIED MULTI-VIEW DATA VISUALIZATION

(71) Applicant: SAP SE, Walldorf (DE)

(72) Inventors: Sateesh Babu Chilamakuri, Tirupati (IN); Sathya G, Kerala (IN); Ramachandra Mahapatra, Odisha (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/016,100

(22) Filed: Sep. 9, 2020

(51) Int. Cl.
| | | |
|---|---|---|
| *G06T 11/20* | (2006.01) | |
| *G06F 16/248* | (2019.01) | |
| *G06F 3/0482* | (2013.01) | |
| *G06F 16/2457* | (2019.01) | |
| *G06F 16/26* | (2019.01) | |

(52) U.S. Cl.
CPC .......... *G06T 11/206* (2013.01); *G06F 3/0482* (2013.01); *G06F 16/248* (2019.01); *G06F 16/24578* (2019.01); *G06F 16/26* (2019.01)

(58) Field of Classification Search
None
See application file for complete search history.

(56) References Cited

U.S. PATENT DOCUMENTS

| | | | |
|---|---|---|---|
| 9,792,017 B1* | 10/2017 | Landefeld | G06F 3/04883 |
| 2003/0071814 A1* | 4/2003 | Jou | G06F 9/542 |
| | | | 345/440 |
| 2006/0218563 A1* | 9/2006 | Grinstein | G06F 8/20 |
| | | | 719/328 |
| 2011/0115814 A1* | 5/2011 | Heimendinger | G06F 3/04883 |
| | | | 345/619 |
| 2013/0097177 A1* | 4/2013 | Fan | G06F 16/221 |
| | | | 707/748 |
| 2013/0103677 A1* | 4/2013 | Chakra | G06F 16/248 |
| | | | 707/723 |
| 2016/0092530 A1* | 3/2016 | Jakubiak | G06F 16/26 |
| | | | 715/202 |
| 2017/0046872 A1* | 2/2017 | Geselowitz | G06F 3/04845 |
| 2018/0349516 A1* | 12/2018 | Dutta | G06F 3/0481 |
| 2019/0324968 A1* | 10/2019 | Kelly | G06N 5/04 |

\* cited by examiner

*Primary Examiner* — Mandrita Brahmachari
(74) *Attorney, Agent, or Firm* — Klarquist Sparkman, LLP

(57) ABSTRACT

Systems, methods, and computer media for visualizing data are provided herein. The described examples allow multiple data visualizations generated using multiple visualization tools to be displayed in response to a single data visualization request generated using a single visualization tool. A data visualization request can specify data for inclusion in a data visualization and properties for the visualization. Features can be extracted from the request and converted to corresponding features for other visualization tools. Both the visualization tool through which the request was generated and the other visualization tools can generate data visualizations for display.

20 Claims, 11 Drawing Sheets

224

UNIFIED MULTI-VIEW DATA VISUALIZATION

BACKGROUND

Analytics software is commonly used to analyze and interpret large amounts of data. Visualization tools, for example, can provide graphical representations of different aspects of data to allow a user to understand complicated relationships or easily observe trends. As visualization tools proliferate, it has become increasingly difficult to maintain knowledge of and proficiency in the various tools as well as time consuming and resource intensive to use multiple tools.

DETAILED DESCRIPTION

The examples described herein provide access to multiple data visualizations, created using different visualization tools, based on a single data visualization request. A data visualization is a graphical representation of data, such as a chart, graph, or table. Data visualizations have a visualization type, which can be, for example, a stacked column chart, a column chart, a three-dimensional column chart, a bar chart, a line chart, an area chart, a table, a pie chart, a donut chart, a ring visualization, or other visualization type.

As used herein, a "visualization tool" is an application, add-on, plugin, extension, or other software that provides functionality for representing data using a data visualization. Visualization tools can also be referred to as reporting tools. A single visualization tool is typically capable of representing data in multiple ways (e.g., in a table, as a pie chart, as a bar chart, etc.), and different tools can offer or focus on different visualization types. For example, a first visualization tool might include the ability to generate three-dimensional (3D) visualizations, whereas another tool might focus on tables. Examples of visualization tools include SAP Web Intelligence (Webi), SAP Crystal Reports, and SAP Lumira (of SAP SE, Walldorf, Germany).

As a specific example of the novel approaches described herein, a user of a first visualization tool selects data to be visualized, selects a visualization type (e.g., column chart), and causes a data visualization request to be generated. Rather than simply returning the requested data visualization, the request is intercepted, and features are extracted from the request. Features describe various aspects of the request and can include the visualization type, axis markings, colors, shading, font, the data selected, or other aspects of the data visualization the user is requesting. The extracted features are then converted into features appropriate for other visualization tools. The request (or extracted features) is used to generate the requested data visualization, and the converted features are used to generate additional data visualizations that correspond to the other visualization tools. The user is then provided, for example, three data visualizations, each generated through a different visualization tool, in response to a single request. This allows the user to benefit from different strengths and options of multiple visualization tools without having to submit similar requests through each tool. This approach simplifies visualization of data for the user and saves computing resources by allowing a single request to be generated and processed for multiple visualization tools. Additional examples are described below with reference to FIGS. 1-9.

Figure 1:
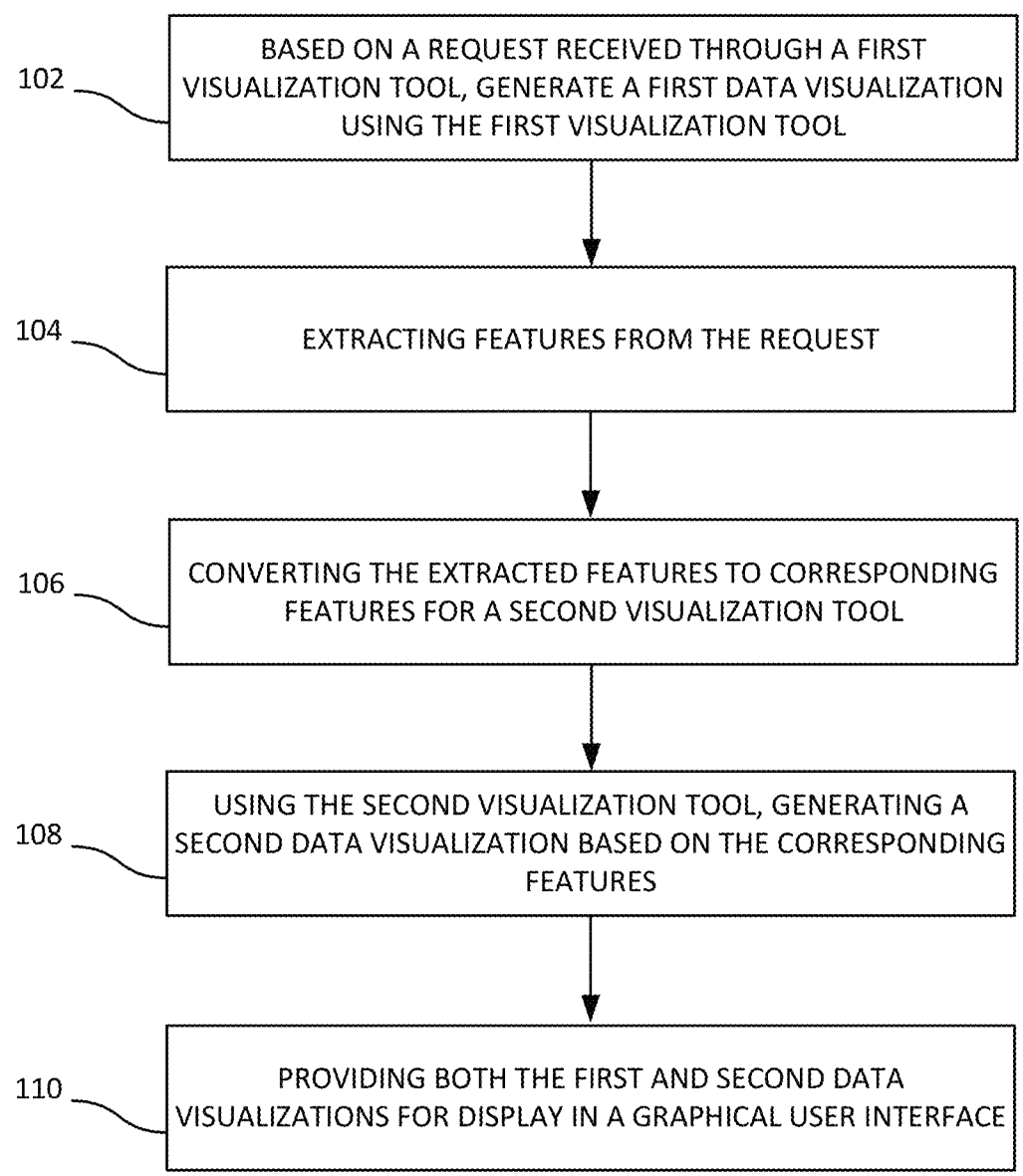
FIG. 1 illustrates an example method of visualizing data.

FIG. 1 illustrates a method 100 of visualizing data. In process block 102, a first data visualization is generated using a first visualization tool. The first data visualization is based on a request received through the first visualization tool. The request specifies data for inclusion in the first data visualization and properties for the first data visualization. The data for inclusion can be specified by identifying a source of data (e.g., columns/rows in a database or other data store, etc.). Example properties for the visualization include a data visualization type, axis indicators, colors, shadings, font, title, legend, etc. Properties can also include identification of which specified data are measures and dimensions. The terms "measures" and "dimensions" are well-known in analytics. As an example, in a visualization depicting population by city, the cities (x-axis) are dimensions and population (y-axis) is a measure. "Dimensions" used in this context does not refer to a geometric dimension such as a measurement of height, width, or length, or a state of being one-dimensional, two-dimensional (2D), or three-dimensional (3D).

The properties (and identification of specified data) can be included in the request as metadata or in another format that the first visualization tool is configured to parse. The request can be initiated by a user interacting with analytics or data visualization software (e.g., a web application or a locally executing application) through a user interface. In some visualization tools, the tool is opened first and a user can then enter a selection of the desired data and properties. In other examples, data can be selected first and then an option can be selected to request generation of a data visualization using one of the available visualization tools (e.g., the different visualization tools can be available as plugins to an analytics application).

In process block 104, features are extracted from the request. Features can be or can include the data and properties specified in the request. In some examples, the features are, or are based on, metadata included in the request. The features can be parsed from the request based on the structure of the request, which can correspond to the particular visualization tool.

The features extracted from the request are converted to corresponding features for a second visualization tool in process block 106. Conversion can be accomplished using a feature map containing a group of features for the first visualization tool and that indicates corresponding features for the second visualization tool. Using the feature map, features can effectively be translated between visualization tools. The feature map can be generated, for example, by string pattern matching between the metadata or features of requests for different visualization tools. In some situations, features for one visualization tool may not have a corresponding feature in another visualization tool. For some such situations, a somewhat comparable feature can be manually mapped, or for cases where a somewhat comparable feature is not identified, the corresponding feature can be listed as null. The feature map can be generated prior to implementation of the described approaches and updated periodically.

Figure 6:
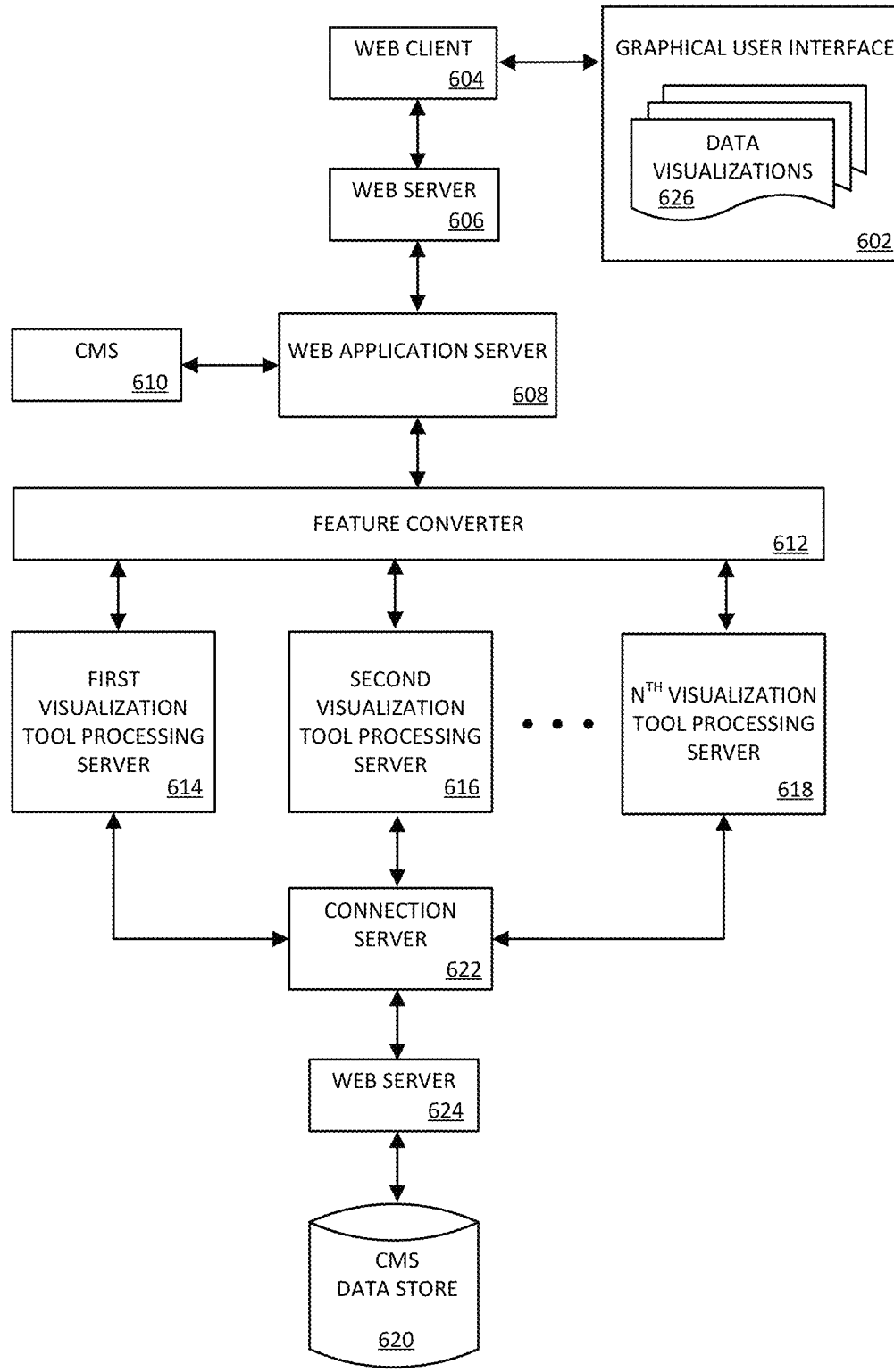
FIG. 6 illustrates an example system in which data visualization tools are implemented through a web application.
Figure 7:
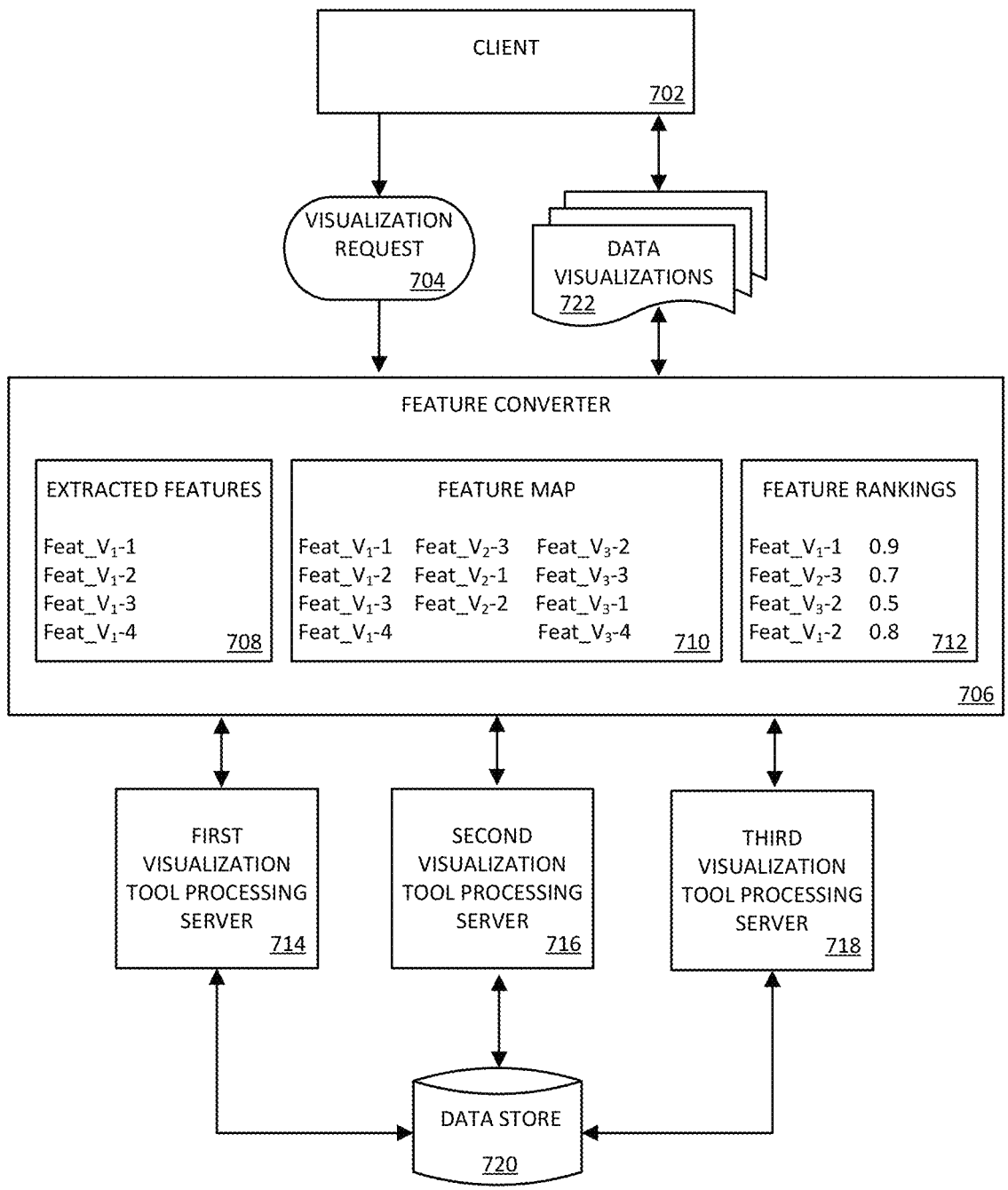
FIG. 7 illustrates example feature extraction from a visualization request and an example feature map for features corresponding to three different visualization tools.

Using the second visualization tool, a second data visualization is generated in process block 108 based on the corresponding features. The first and second visualization tools are each capable of representing the specified data using multiple types of data visualizations. Each visualization tool can have separate software that generates corresponding data visualizations. In a specific web application example, different visualization tools can each have distinct processing servers, either physically separate servers or separate virtual machines. An example of such configurations is shown in FIGS. 6 and 7.

Both the first and second data visualizations are provided for display in a graphical user interface in process block 110. The first and second data visualizations can be presented as selectable previews or as full data visualizations. The first and second data visualizations represent the data specified for inclusion in the request in different ways. Examples of the same data being represented by different data visualizations is shown in FIGS. 2A-3C.

In some examples, a preferred format or data visualization type for the second data visualization is determined based on feature rankings of the features extracted from the request or the corresponding features for the second visualization tool. Feature rankings can be based on user preferences (either explicit preferences or user selection history). Feature rankings allow prediction of a preferred data visualization type based on which features are extracted (including which measures and dimensions are specified) and which data visualization type a user has historically preferred given that set of features. As an example, consider a situation in which the request specifies a column chart, and the first data visualization is a column chart. If the second data visualization were a pie chart, and the user selected to save or view the pie chart instead of the bar chart, it could be inferred that the user prefers pie charts for those particular features. Each of the features associated with the selection of the pie chart is then positively associated with the pie chart (e.g., a ranking score for that feature can be increased). Features can be assigned an initial rank with respect to a certain visualization type, and the rank can be increased when the visualization type is selected (e.g., establish an initial rank of 0.1 and increment in 0.05, 0.1, etc. units). Thus, for each data visualization type, the potential features can be ranked. When a data visualization request with a set of features is analyzed, a highest-ranking data visualization for those features can be identified.

Various prediction algorithms can be used to recommend a visualization type based on the rankings of the features and the selected measures and dimensions for the visualization. Prediction algorithms can be chosen based on the data set used to train. As the dataset varies, the prediction algorithm can also vary. In some examples, a feature rank table is used that contains ranks associated with each feature. By default, the ranks can be assigned based on predetermined best practices. The ranks can be updated based on actual user selection over time.

In some examples, a collaborative filtering approach is used. In this approach, recommendations are based on the past interactions recorded between users/customers and features selected for a group of measures/dimensions. These interactions can be stored as user-feature interaction matrix. This matrix is provided as an input to a prediction algorithm. Based on the result from the prediction algorithm, the ranks associated with the respective features are updated in the feature rank table. In order to make computations more tractable for huge systems, advantage can be taken of the sparsity of the interaction matrix when designing the algorithm, or an approximate nearest neighbor method (ANN) can be used.

An advantage of such an approach is that it is a memory-based methodology which works directly with values of interactions. Absence of a model reduces complexity as well as load. For a large matrix, using a model to predict can be costlier both in time as well as space. Another advantages of a collaborative filtering approach is that it does not require information about users and can thus be used in many situations. Moreover, the more users interact with items the more accurate recommendations become. For a fixed set of users and items, new interactions recorded over time bring new information and make the system more and more effective. Other predictive approaches can also be used, including linear regression, random forest, gradient boosted models, and K-means approaches.

In some examples, features are extracted from the request and converted prior to generation of both the first and second data visualizations. In other examples, the feature extraction and conversion is performed after generation of the first data visualization.

Figure 2A:
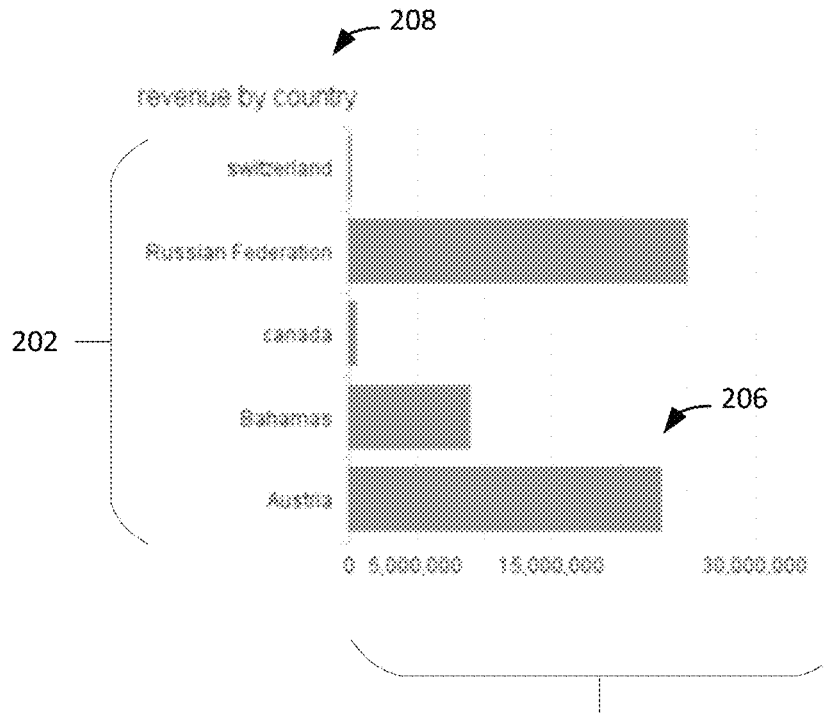
FIGS. 2A-2C illustrate example data visualizations created for the same data using different visualization tools.
Figure 2B:
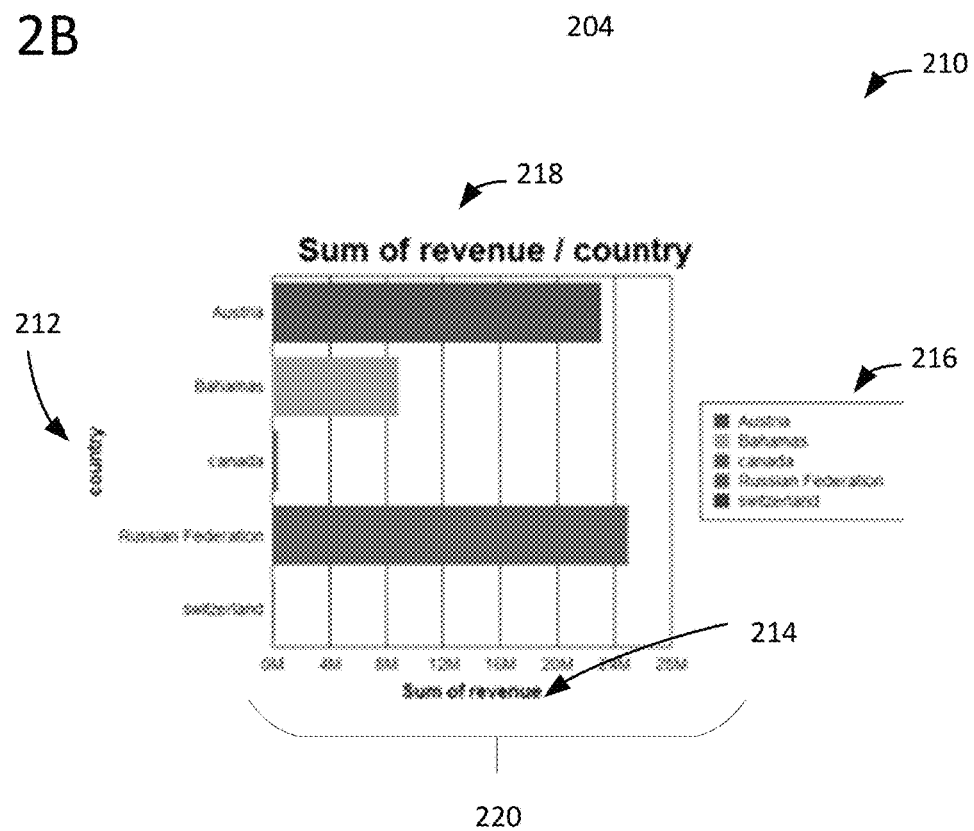
Figure 2C:
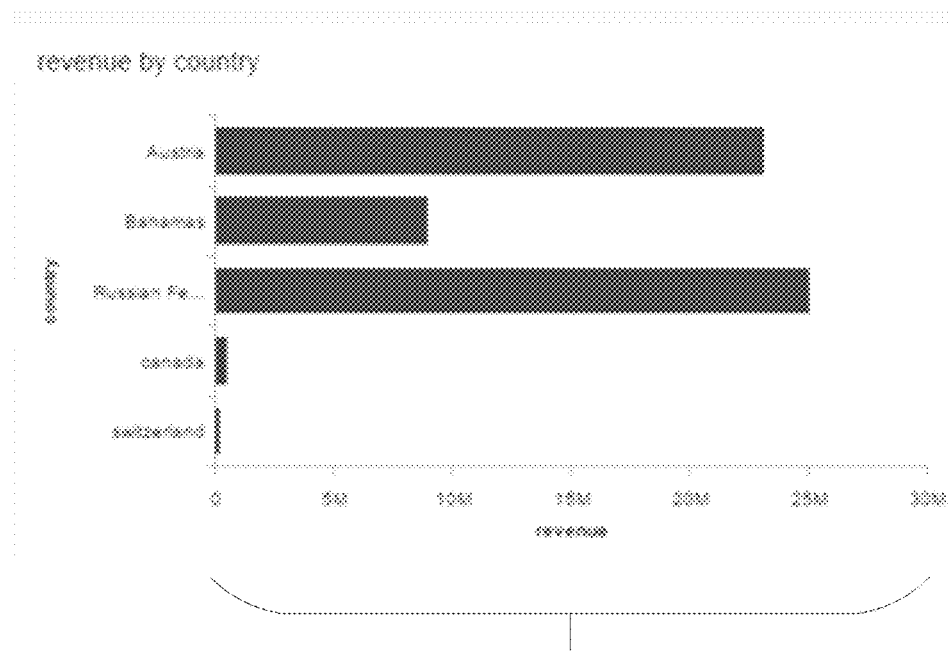

FIGS. 2A-2C illustrate revenue amounts for different countries. Data visualization 200 shown in FIG. 2A is a bar chart. Data visualization 200 shows y-axis labels 202 naming five countries and x-axis markings 204 indicating monetary amounts between 0 and 30,000,000. Bars for the respective countries, such as bar 206 representing Austria, indicate the revenue corresponding to each country. Data visualization 200 also includes a title 208, "revenue by country."

Data visualization 210 illustrates the same data but generated using a different visualization tool and thus has a different appearance (but also a bar chart). Data visualization 210 includes y-axis label 212 "country," x-axis label 214 "Sum of revenue," legend 216, and a different title 218 "Sum of revenue/country." X-axis markings 220 are also different from those in data visualization 200 (a marking every four million).

Figure 3A:
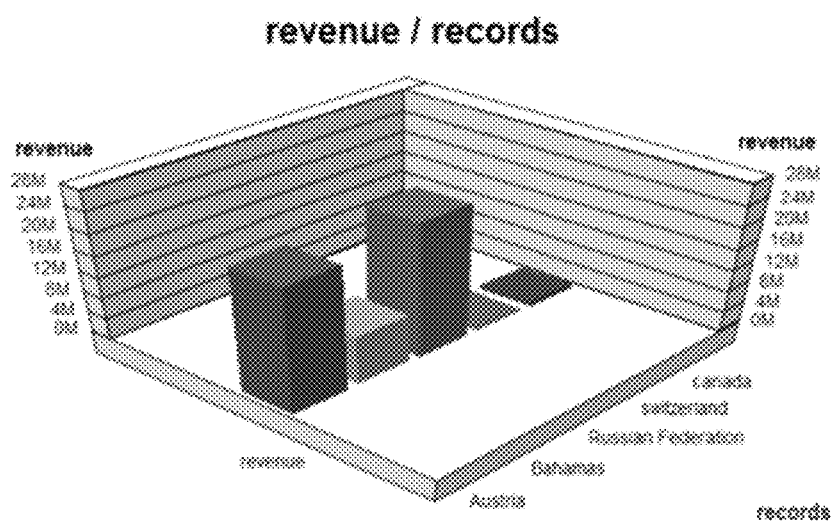
FIGS. 3A-3C illustrate example data visualizations created for the same data using different visualization tools where a visualization type available in one visualization tool is not available in the other two visualization tools.
Figure 3B:
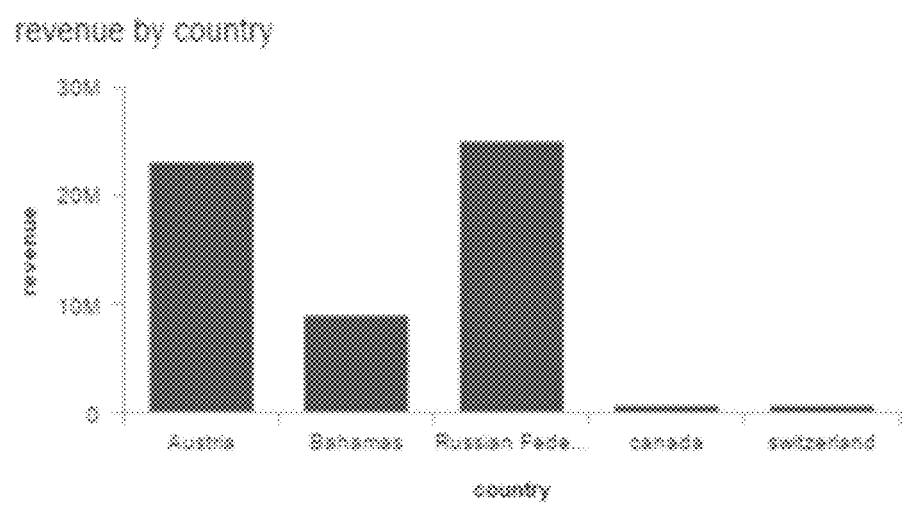
Figure 3C:
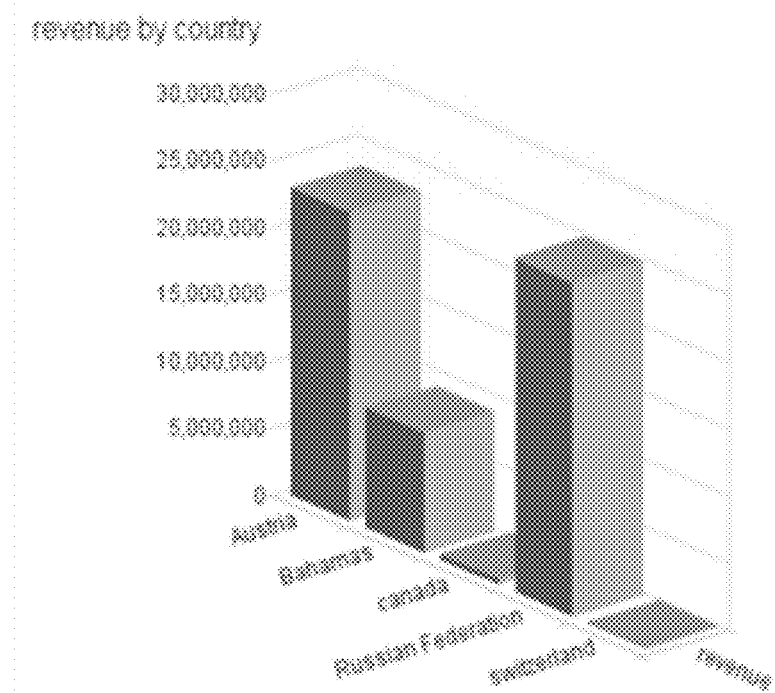

Data visualization 222 shown in FIG. 2C is also a bar chart but is generated by still a different visualization tool and varies in appearance from data visualizations 200 and 210. For example, x-axis markings 224 are in increments of five million. In FIGS. 2A, 2B, and 2C, data visualizations 200, 210, and 222 are all bar charts. FIGS. 3A-3C illustrate a situation where the visualization type of the first visualization is unavailable in other visualization tools, so a different visualization type is used by the other tools.

Data visualization 300 of FIG. 3A is a 3D riser chart illustrating the same data as FIGS. 2A-2C. Data visualization 300 was generated using SAP Crystal Reports. Data visualization 302 of FIG. 3B and data visualization 304 of FIG. 3C are generated using SAP Lumira and SAP Webi, respectively. Neither Lumira nor Webi support 3D riser charts, so alternatives are determined. For data visualization 302 of FIG. 3B, a column chart is selected because 3D visualizations are not available in SAP Lumira. For data visualization 304 of FIG. 3C, although a 3D riser chart is not available, Webi does support a 3D column chart, so data visualization 304 is a 3D column chart. Mapping a most appropriate visualization type to a visualization type that is not supported can be done through pre-determined manual mapping or string matching (e.g., if a stacked bar chart is not available, identify another visualization type with the string "bar" in the type).

Figure 4:
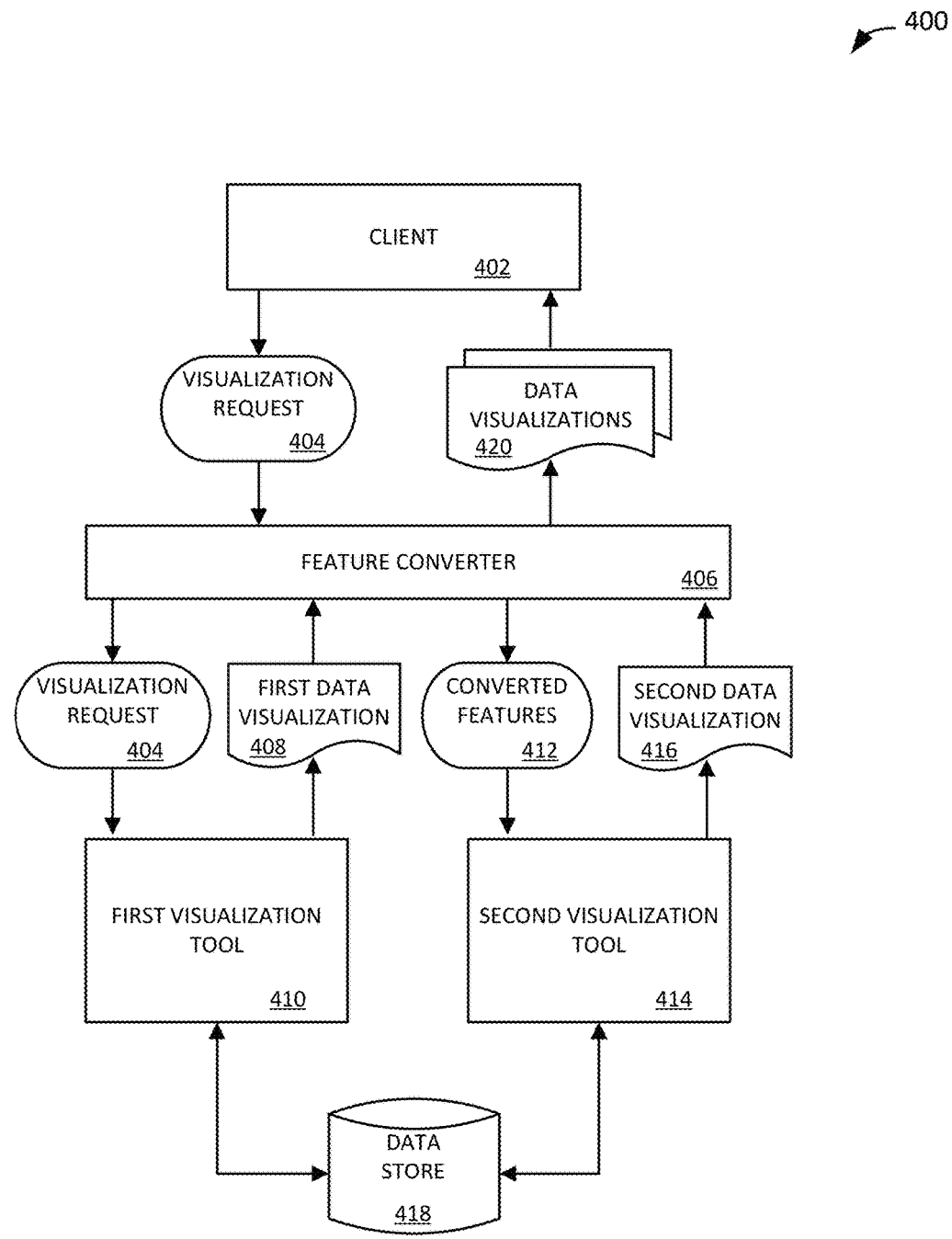
FIG. 4 illustrates an example flow for generating data visualizations corresponding to two different visualization tools based on one visualization request.

FIG. 4 shows a visualization system 400. A client 402 submits a visualization request 404 to a feature converter 406. Request 404 can be initiated by a user through a user interface associated with client 402. Visualization request 404 specifies data and properties for a first data visualization 408. Visualization request 404 was made using a first visualization tool 410 (accessible via client 402), so to generate additional data visualizations from other visualization tools, feature converter 406 extracts features from visualization request 404 and converts the extracted features. Converted features 412 can then be provided to a second visualization tool 414. Second visualization tool 414 can generate a second data visualization 416 based on converted features 412. First visualization tool 410 and second visualization tool 414 access specified data from data store 418, which can be a database or other data store. If additional visualization tools are used to create additional data visualizations, the extracted features are converted to features corresponding to those additional visualization tools. Feature converter 406 then provides data visualizations 420, which includes first data visualization 408 and second data visualization 416, to client 402. In some examples, first visualization tool 410 and second visualization tool 414 provide data visualizations 420 to client 402 without interacting with feature converter 406.

Data visualizations 420 can be previews that are displayed using client 402 for user viewing and selection. In this way, a user can see both the data visualization they requested as well as an additional data visualization. If the user prefers the additional data visualization, it can be selected for use, saved, etc. In other examples, data visualizations 420 are full visualizations rather than previews that the user can determine whether to save or use. In some examples, various additional system components are involved in rendering the data visualization so that first data visualization 408 and second data visualization 416 contain the information necessary for rendering the final data visualizations. The term "data visualization" encompasses such data necessary for rendering the final data visualizations. (E.g., a laid-out visualization can be provided to a viewer associated with a user interface, and the viewer actually renders the visualization.) Visualization request 404 can be sent to first visualization tool 410 either before or after feature conversion. In some examples, the extracted features are provided to first visualization tool 410 in place of or in addition to visualization request 404. In some examples, both the extracted features as well as converted features 412 are sent together to both first visualization tool 410 and second visualization tool 414, and the respective tools access the relevant features for that tool.

Figure 5:
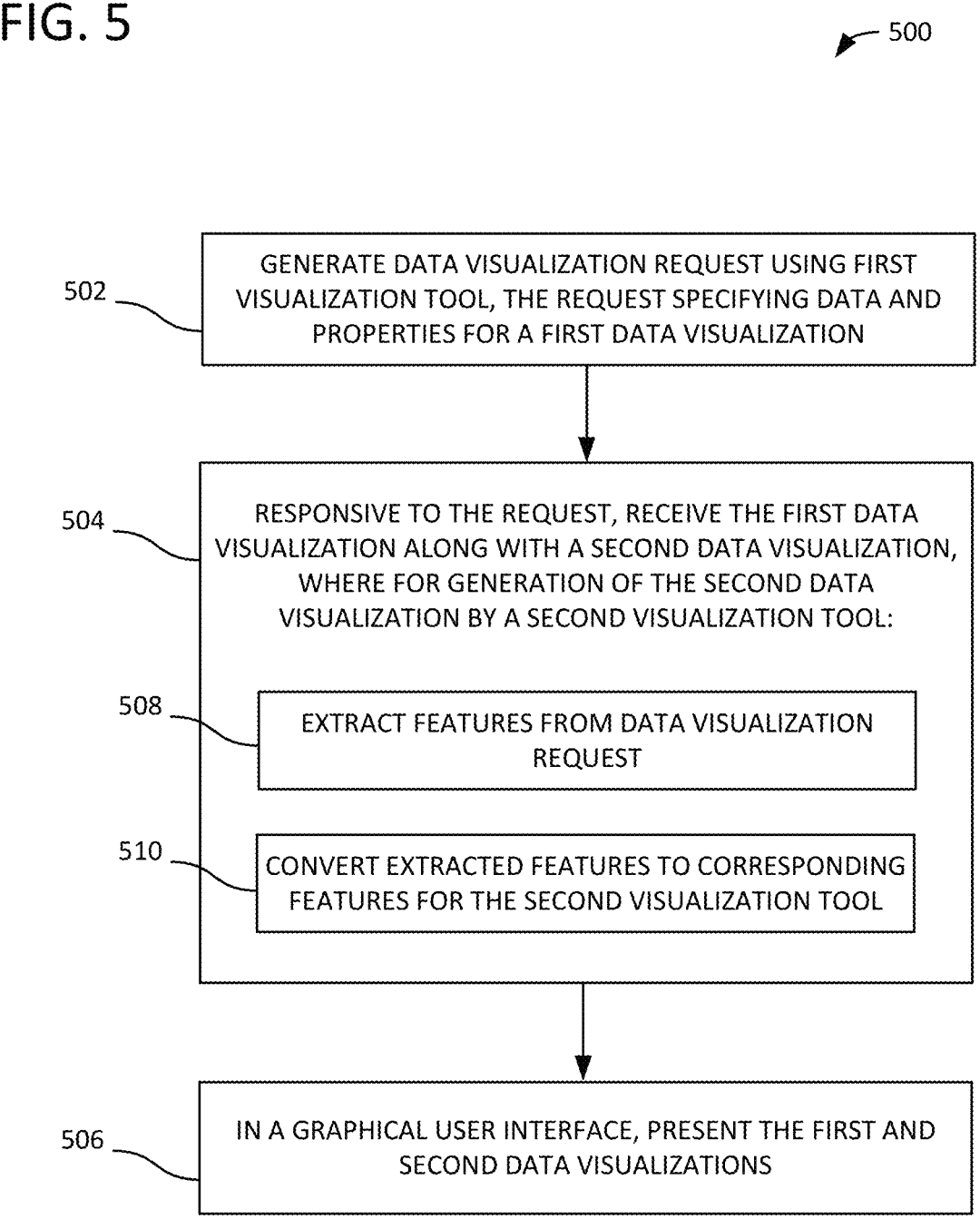
FIG. 5 illustrates an example method of visualizing data in which two data visualizations are presented in a graphical user interface in response to a single visualization request.

FIG. 5 illustrates a method 500 of visualizing data. In process block 502, a data visualization request is generated using a first visualization tool. The data visualization request includes data to be represented in a first data visualization and properties for the first data visualization. Responsive to the data visualization request, the first data visualization is received in process block 504 along with a second data visualization. The second data visualization is generated using a second visualization tool. Generation of the second data visualization comprises process blocks 508 and 510. In process block 510, features are extracted from the data visualization request, and in process block 512, the features extracted from the data visualization request are converted to corresponding features for the second visualization tool. Conversion can be accomplished, for example, using a feature map. In process block 506, the first and second data visualizations are presented in a graphical user interface.

FIG. 6 illustrates a system 600 configured to visualize data in a web application. A user (not shown) interacts through a graphical user interface 602 with a web client 604 and causes a visualization request to be generated for a first visualization tool. The first visualization tool can include menus and other interface functionality presented through graphical user interface 602 as well as functionality distributed among components illustrated in system 600 (including first visualization tool processing server 614). Web client 604 forwards the request to a web server 606, which forwards the request to web application server 608. Web application server 608 determines which visualization tool corresponds to the request and accesses a central management server (CMS) 610 to determine which visualization tools the user is authorized to access. In some examples, CMS 610 is omitted, and determination of authorization is determined, e.g., via interaction with web client 604 at login.

Web application server 608 forwards the request to feature converter 612, which extracts features from the request and converts the extracted features to features corresponding to other visualization tools. This can be done using a feature map. As an example, if the request was made using the second visualization tool, then extracted features are converted to corresponding features for the first, third, etc. visualization tools. Feature converter 612 can then send the relevant features (e.g., extracted or converted) to first visualization tool processing server 614, second visualization tool processing server 616, . . . and $n^{th}$ visualization tool processing server 618. Processing servers 614, 616, and 618 are shown in FIG. 6 as separate servers, but in some examples, processing servers 614, 616, and 618 are virtual machines within a single server or multiple servers or have distributed functionality across multiple servers. Processing servers 614, 616, and 618 access data for their corresponding data visualizations in CMS data store 620 via connection server 622 and web server 624. In some examples, connection server 622 and web server 624 are omitted.

Processing servers 614, 616, and 618 provide data visualizations 626 back to feature converter 612, which sends data visualizations 626 to web client 604, via web application server 608 and web server 606, for display in graphical user interface 602.

In some examples, the extracted features are provided to the processing server corresponding to the visualization tool through which the visualization request was made. In other examples, the request is forwarded to the corresponding processing server along with or instead of the extracted features. In some examples, both the extracted features as well as converted features are sent together to all of the processing servers, and the respective processing servers access the relevant features for that tool.

FIG. 7 illustrates a data visualization system 700. A client 702 sends a visualization request 704 to a feature converter 706. Visualization request 704 is for a first visualization tool (e.g., the properties and other information are specified in a manner the first visualization tool is configured to process). Feature converter 706 extracts features 708 from request 704, shown as "Feat_$V_1$-1," "Feat_$V_1$-2," etc. "$V_1$" indicates a feature for the first visualization tool. Feature map 710 indicates a mapping of features for visualization tools $V_1$, $V_2$, and $V_3$. Each visualization tool is different, so a visualization request for one tool will likely not be interpreted properly for a different tool. As shown in feature map 710, "Feat_$V_1$-1" for visualization tool V1 corresponds to "Feat_$V_2$-3" for visualization tool $V_2$ and feature "Feat_$V_3$-2" for visualization tool $V_3$. Feature map 710 allows feature converter 706 to translate visualization request 704 into something that can be understood by other visualization tools. Feature rankings 712 indicate rankings for particular features with respect to particular data visualization types for given measures and dimensions. Ranking is discussed in detail with respect to FIG. 1.

Extracted features 708 are provided to a first visualization tool processing server 714, and features converted using feature map 710 are provided to a second visualization tool processing server 716 and a third visualization tool processing server 718. In some examples, extracted features 708 and converted features are packaged together and provided to each of first, second, and third visualization tool processing servers 714, 716, and 718, and the relevant information for the respective tools is extracted. First visualization tool processing server 714 accesses data for a first data visualization from data store 720 and generates a first data visualization. Second visualization tool processing server 716 and third visualization tool processing server 718 similarly access data from data store 720 and generate second and third data visualizations, respectively. Feature converter 706 provides data visualizations 722 (including the first, second, and third data visualizations) back to client 702. In some examples the respective processing servers provide data visualizations 722 back to client 702 without interacting with feature converter 706.

Figure 8:
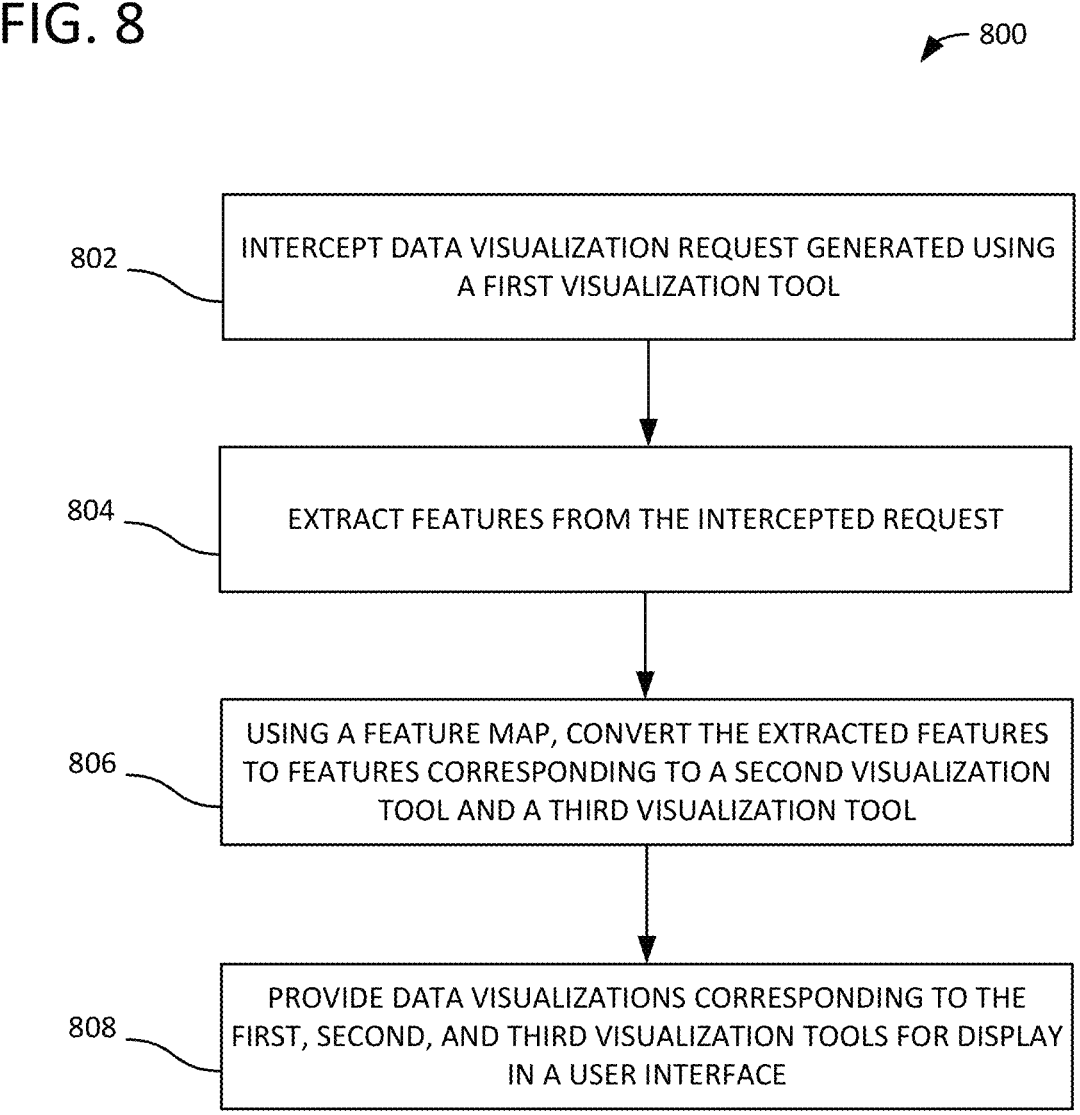
FIG. 8 illustrates an example method of visualizing data in which three data visualizations are provided corresponding to three different visualization tools in response to a single visualization request.

FIG. 8 illustrates a method 800. In process block 802, a data visualization request generated using a first visualization tool is intercepted. The visualization request specifies data for inclusion in a data visualization and a data visualization type. In process block 804, features are extracted from the intercepted data visualization request. Extracted features can be or can be based on metadata associated with the request. In process block 806, using a feature map, the features extracted from the visualization are converted to features corresponding to a second visualization tool and a third visualization tool. The feature map indicates corresponding features among the first, second, and third visualization tools. In process block 808, data visualizations are provided corresponding to the first, second, and third visualization tools for display in a user interface. The respective data visualizations represent the data specified for inclusion but have different visualization types.

Example Computing Systems

Figure 9:
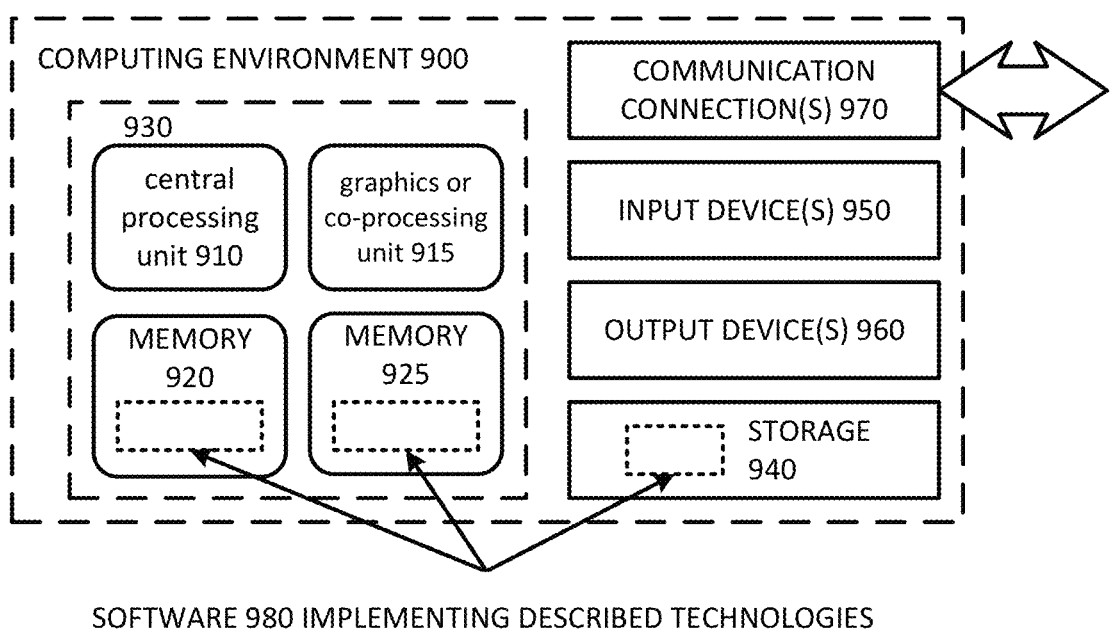
FIG. 9 is a diagram illustrating a generalized implementation environment in which some described examples can be implemented.

FIG. 9 depicts a generalized example of a suitable computing system 900 in which the described innovations may be implemented. The computing system 900 is not intended to suggest any limitation as to scope of use or functionality, as the innovations may be implemented in diverse general-purpose or special-purpose computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s). For example, memory 920 and 925 can store feature converter 406 of FIG. 4, feature converter 612 of FIG. 6, or feature converter 706 of FIG. 7.

A computing system may have additional features. For example, the computing system 900 includes storage 940, one or more input devices 950, one or more output devices 960, and one or more communication connections 970. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing system 900. The storage 940 stores instructions for the software 980 implementing one or more innovations described herein. For example, storage 940 can store feature converter 406 of FIG. 4, feature converter 612 of FIG. 6, or feature converter 706 of FIG. 7.

The input device(s) 950 may be a touch input device such as a keyboard, mouse, pen, or trackball, a voice input device, a scanning device, or another device that provides input to the computing system 900. For video encoding, the input device(s) 950 may be a camera, video card, TV tuner card, or similar device that accepts video input in analog or digital form, or a CD-ROM or CD-RW that reads video samples into the computing system 900. The output device(s) 960 may be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer and should not be confused with acts performed by a human being. The actual computer operations corresponding to these terms vary depending on implementation.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 9, computer-readable storage media include memory 920 and 925, and storage 940. The term computer-readable storage media does not include signals and carrier waves. In addition, the term computer-readable storage media does not include communication connections (e.g., 970).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

We claim:

1. A method of visualizing data, comprising:
based on a request for a first data visualization received through a first visualization tool, generating the first data visualization using the first visualization tool, the request specifying data for inclusion in the first data visualization and properties for the first data visualization;
extracting features from the request;
converting the features extracted from the request to corresponding features for a second visualization tool, wherein the first and second visualization tools are part of different applications;
using the second visualization tool, generating a second data visualization based on the corresponding features; and
providing both the first and second data visualizations for display in a graphical user interface.

2. The method of claim 1, wherein the first and second visualization tools are each capable of representing the specified data using multiple types of data visualizations.

3. The method of claim 1, wherein the first and second data visualizations represent the data specified for inclusion in the request differently.

4. The method of claim 1, wherein the features extracted from the request are converted using a feature map containing a group of features for the first visualization tool and indicating corresponding features for the second visualization tool.

5. The method of claim 4, wherein the feature map is generated in part through string pattern matching between features for the first and second visualization tools.

6. The method of claim 1, further comprising, based on feature rankings of the features extracted from the request or the corresponding features for the second visualization tool, automatically determining a preferred format or data visualization type for the second data visualization.

7. The method of claim 6, wherein the feature rankings are based in part on a user selection history.

8. The method of claim 1, further comprising:
using the feature map, converting the features extracted from the request to corresponding features for a third visualization tool;
generating a third data visualization using the third visualization tool based on the corresponding features for the third visualization tool; and
providing the third data visualization for display in the graphical user interface along with the first and second data visualizations.

9. The method of claim 1, wherein the first and second data visualizations provided for display are user-selectable previews.

10. The method of claim 1, wherein the features are extracted from the request and converted using the feature map prior to generation of the first and second data visualizations.

11. The method of claim 1, wherein upon determining that a data visualization type specified in the request is not available in the second visualization tool, selecting an alternate data visualization type for the second data visualization.

12. One or more computer-readable storage media storing computer-executable instructions for visualizing data, the visualizing comprising:
generating a data visualization request using a first visualization tool of a first application, the data visualization request including data to be represented in a first data visualization and properties for the first data visualization;
responsive to the data visualization request, receiving the first data visualization along with a second data visualization, wherein the second data visualization is generated using a second visualization tool of a second application, wherein the first and second applications are different applications, and wherein generation of the second data visualization comprises:
extracting features from the data visualization request; and
converting the features extracted from the data visualization request to corresponding features for the second visualization tool; and
in a graphical user interface, presenting the first and second data visualizations.

13. The one or more computer-readable storage media of claim 12, wherein the properties comprise one or more of: a data visualization type, axis indicators, a title, or a legend.

14. The one or more computer-readable storage media of claim 12, wherein the first and second visualization tools are each capable of representing the data using multiple types of data visualizations.

15. The one or more computer-readable storage media of claim 12, wherein a data visualization type of the second data visualization is determined based on feature rankings for the corresponding features for the second visualization tool.

16. The one or more computer-readable storage media of claim 12, wherein the features extracted from the data visualization request are converted using a feature map containing a group of features for the first visualization tool and indicating corresponding features for the second visualization tool.

17. A system, comprising:
a processor; and
one or more computer-readable storage media storing computer-readable instructions that, when executed by the processor, perform operations comprising:
intercepting a data visualization request generated using a first visualization tool, the data visualization request specifying data for inclusion in a data visualization and a data visualization type;
extracting features from the intercepted data visualization request;
using a feature map, converting the features extracted from the visualization request to features corresponding to a second visualization tool and a third visualization tool, wherein the feature map indicates corresponding features among the first, second, and third visualization tools; and
providing data visualizations corresponding to the first, second, and third visualization tools for display in a user interface, wherein the respective data visualizations represent the data specified for inclusion but have different visualization types.

18. The system of claim 17, wherein the features are extracted from the data visualization request and converted using the feature map prior to generation of the reports of the first and second type.

19. The system of claim 17, wherein the provided data visualizations are user-selectable previews.

20. The system of claim 17, wherein the provided data visualizations corresponding to the second and third visualization tools have a data visualization type based on feature rankings of the features extracted from the visualization request or the features corresponding to the second or third visualization tools.

* * * * *